(12) United States Patent
Im et al.

(10) Patent No.: US 8,748,027 B2
(45) Date of Patent: Jun. 10, 2014

(54) MIDDLE OR LARGE-SIZED BATTERY PACK CASE PROVIDING IMPROVED DISTRIBUTION UNIFORMITY OF COOLANT FLUX

(75) Inventors: Ye Hoon Im, Daejeon (KR); Dooseong Choi, Daejeon (KR); Sang Phil Han, Daejeon (KR); Jongmoon Yoon, Daejeon (KR); Jaesung Ahn, Daejeon (KR); Heekook Yang, Daejeon (KR); Dal Mo Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 775 days.

(21) Appl. No.: 12/664,371

(22) PCT Filed: Jun. 12, 2008
(Under 37 CFR 1.47)

(86) PCT No.: PCT/KR2008/003284
§ 371 (c)(1),
(2), (4) Date: Aug. 13, 2010

(87) PCT Pub. No.: WO2008/153326
PCT Pub. Date: Dec. 18, 2008

(65) Prior Publication Data
US 2011/0262791 A1   Oct. 27, 2011

(30) Foreign Application Priority Data
Jun. 14, 2007   (KR) ................ 10-2007-0058077

(51) Int. Cl.
*H01M 10/50* (2006.01)
*H01M 2/00* (2006.01)
*H01M 2/10* (2006.01)
*H01M 10/052* (2010.01)
*H01M 10/34* (2006.01)

(52) U.S. Cl.
CPC .......... *H01M 2/1077* (2013.01); *H01M 10/052* (2013.01); *Y02T 10/7011* (2013.01); *Y02E 60/12* (2013.01); *H01M 10/5073* (2013.01); *H01M 10/5067* (2013.01); *H01M 10/5004* (2013.01); *H01M 10/345* (2013.01)
USPC .......................................... 429/120; 429/163

(58) Field of Classification Search
CPC .......... H01M 10/50; H01M 2/00; H01M 2/02
USPC ......... 429/120, 163–187, 149–160; 180/68.5; 62/259.2, 515
See application file for complete search history.

(56) References Cited

U.S. PATENT DOCUMENTS 3,745,048 A * 7/1973 Dinkler et al. ................ 429/120
(Continued)

FOREIGN PATENT DOCUMENTS

CN            1812182 A         8/2006
(Continued)

*Primary Examiner* — Patrick Ryan
*Assistant Examiner* — Kiran Quraishi
(74) *Attorney, Agent, or Firm* — Birch, Stewart, Kolasch & Birch, LLP

(57) ABSTRACT

Disclosed herein is a middle- or large-sized battery pack case in which a battery module having a plurality of stacked battery cells, which can be charged and discharged, is mounted, wherein the battery pack case is provided with a coolant inlet port and a coolant outlet port, which are disposed such that a coolant for cooling the battery cells can flow from one side to the other side of the battery module in the direction perpendicular to the stacking direction of the battery cells, the battery pack case is further provided with a flow space ('inlet duct') extending from the coolant inlet port to the battery module and another flow space ('outlet duct') extending from the battery module to the coolant outlet port, and one or more guide members are disposed in the inlet duct for guiding the flow of the coolant in the direction parallel to the stacking direction of the battery cells.

15 Claims, 4 Drawing Sheets

(56) References Cited

U.S. PATENT DOCUMENTS

| | | | |
|---|---|---|---|
| 4,522,898 A * | 6/1985 | Esrom | 429/120 |
| 5,589,290 A * | 12/1996 | Klink et al. | 429/99 |
| 2001/0026886 A1* | 10/2001 | Inui et al. | 429/120 |
| 2005/0153199 A1* | 7/2005 | Yagi et al. | 429/148 |
| 2006/0091856 A1* | 5/2006 | Lee et al. | 320/116 |
| 2006/0115716 A1 | 6/2006 | Kim et al. | |
| 2007/0202792 A1* | 8/2007 | Shimizu et al. | 454/69 |

FOREIGN PATENT DOCUMENTS

| | | |
|---|---|---|
| CN | 1905268 A | 1/2007 |
| EP | 1553655 A2 | 7/2005 |
| JP | 2000-67934 A | 3/2000 |
| JP | 2001-283937 A | 10/2001 |
| JP | 2002-219949 A | 8/2002 |
| JP | 2004-291715 A | 10/2004 |
| JP | 2005-085531 A | 3/2005 |
| JP | 2007-234367 A | 9/2007 |
| KR | 10-2004-0031078 A | 4/2004 |
| KR | 10-2006-0037601 A | 5/2006 |
| KR | 10-2006-0101670 A | 9/2006 |
| WO | WO 2006/080679 A1 | 8/2006 |

* cited by examiner

< Flux distribution in channels between cells >

MIDDLE OR LARGE-SIZED BATTERY PACK CASE PROVIDING IMPROVED DISTRIBUTION UNIFORMITY OF COOLANT FLUX

FIELD OF THE INVENTION

The present invention relates to a middle- or large-sized battery pack case, and, more particularly, to a middle- or large-sized battery pack case in which a battery module having a plurality of stacked battery cells, which can be charged and discharged, is mounted, wherein the battery pack case is provided with a coolant inlet port and a coolant outlet port, which are disposed such that a coolant for cooling the battery cells can flow from one side to the other side of the battery module in the direction perpendicular to the stacking direction of the battery cells, the battery pack case is further provided with a flow space ('inlet duct') extending from the coolant inlet port to the battery module and another flow space ('outlet duct') extending from the battery module to the coolant outlet port, and one or more guide members are disposed in the inlet duct for guiding the flow of the coolant in the direction parallel to the stacking direction of the battery cells.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery module having a plurality of battery cells electrically connected with each other because high power and large capacity are necessary for the middle- or large-sized devices.

Preferably, the middle- or large-sized battery module is manufactured with small size and weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

For the middle- or large-sized battery module to provide power and capacity required by a predetermined apparatus or device, it is necessary for the middle- or large-sized battery module to be constructed in a structure in which a plurality of battery cells are electrically connected in series with each other, and the battery cells are stable against an external force.

Also, the battery cells constituting the middle- or large-sized battery module are secondary batteries which can be charged and discharged. Consequently, a large amount of heat is generated from the high-power, large-capacity secondary battery during the charge and discharge of the battery cells. If the heat, generated from the unit cells during the charge and discharge of the unit cells, is not effectively removed, the heat accumulates in the respective unit cells, with the result that the deterioration of the unit cells is accelerated. According to circumstances, the unit cells may catch fire or explode. For this reason, a cooling system is needed in a battery pack for vehicles, which is a high-power, large-capacity battery, to cool battery cells mounted in the battery pack.

In a middle- or large-sized battery pack including a plurality of battery cells, on the other hand, the deterioration in performance of some battery cells leads to the deterioration in performance of the entire battery pack. One of the main factors causing the nonuniformity of the performance is the nonuniformity of cooling between the battery cells. For this reason, it is required to provide a structure to secure the uniformity of cooling during the flow of a coolant.

Generally, when designing a middle- or large-sized battery pack constructed in a structure in which a duct at a coolant inlet port side (hereinafter, referred as an 'inlet duct') and a duct at a coolant outlet port side (hereinafter, referred as an 'outlet duct') are arranged horizontally, it is difficult to achieve uniform distribution of coolant flux between a plurality of battery cells. Especially, the coolant flux concentrates between the battery cells disposed adjacent to the coolant inlet port, with the result that the battery cells disposed adjacent to the coolant inlet port are excessively cooled, whereas the temperatures of the cells disposed distant from the coolant inlet port relatively increase. As a result, the temperature difference between the battery cells increases, with the result that the overall performance of the battery pack lowers due to the deterioration of the battery cells.

On the other hand, it is possible to change the shape of the inlet duct and the outlet duct in order to solve the above problems. In this case, however, the size of the battery pack may increase, and the structural stability of the battery pack may lower, due to the change in shape of the inlet duct and the outlet duct. For this reason, it is preferred to solve the above deterioration-related problem without changing the shape of inlet duct and the outlet duct.

As a technology for solving the problems caused due to the nonuniform distribution of the coolant, Korean Patent Application Publication No. 2006-037601 discloses a battery module including a plurality of unit cells arranged at predetermined intervals and a housing in which the unit cells are mounted, wherein the housing has an inlet part to introduce air for temperature control in a direction inclined to the direction in which the unit cells are arranged and an outlet part to discharge the air having passed through the unit cells. In the disclosed battery module, however, the housing at the inlet part is inclined, with the result that it is difficult to install the battery module in an external device, such as a vehicle. Furthermore, an additional guide member is not mounted in the inlet part, with the result that it is not possible to accurately control the flux of a coolant flowing between the respective battery cells.

Consequently, there is a high necessity for a technology to fundamentally solve the above-mentioned problems.

SUMMARY OF THE INVENTION

Therefore, the present invention has been made to solve the above problems, and other technical problems that have yet to be resolved.

As a result of a variety of extensive and intensive studies and experiments on a middle- or large-sized battery pack case, the inventors of the present invention have found that, when one or more guide members are disposed in an inlet duct formed at the battery pack case to guide the flow of a coolant in the direction parallel with the direction in which battery cells are stacked, it is possible to uniformly distribute the flux of a coolant flowing through flow channels defined between the respective battery cells, with the result that heat accumulating between the battery cells is effectively removed, and therefore, the performance and life span of the battery cells are greatly improved. The present invention has been completed based on these findings.

In accordance with one aspect of the present invention, the above and other objects can be accomplished by the provision of a middle- or large-sized battery pack case in which a battery module having a plurality of stacked battery cells, which can be charged and discharged, is mounted, wherein the battery pack case is provided with a coolant inlet port and a coolant outlet port, which are disposed such that a coolant for cooling the battery cells can flow from one side to the other side of the battery module in the direction perpendicular to the stacking direction of the battery cells, the battery pack case is further provided with a flow space ('inlet duct') extending from the coolant inlet port to the battery module and another flow space ('outlet duct') extending from the battery module to the coolant outlet port, and one or more guide members are disposed in the inlet duct for guiding the flow of the coolant in the direction parallel to the stacking direction of the battery cells.

That is, the middle- or large-sized battery pack case according to the present invention is characterized in that one or more guide members having predetermined lengths are disposed in the inlet duct in the direction perpendicular to the stacking direction of the battery cells for preventing the concentration of the coolant between the battery cells near the coolant inlet port. Consequently, when comparing the inventive structure in which the guide members are disposed in the inlet duct with the conventional structure in which guide members are not disposed in the inlet duct, it is possible to uniformalize the flux of the coolant flowing through flow channels defined between the battery cells, and effectively removing heat generated during the charge and discharge of the battery cells through the uniform flow of the coolant, thereby greatly improving the cooling efficiency and the performance of the battery.

The battery module, mounted in the middle- or large-sized battery pack case according to the present invention, is generally manufactured by a method of stacking a plurality of battery cells with high integration. At this time, the neighboring battery cells are stacked at predetermined intervals such that heat generated during the charge and discharge of the battery cells can be effectively removed. For example, the battery cells may be sequentially stacked such that the battery cells are spaced apart from each other at predetermined intervals without using additional members. When the battery cells have a low mechanical strength, on the other hand, one or several battery cells are mounted in a cartridge, and a plurality of cartridges are stacked to constitute a battery module. Consequently, coolant flow channels are defined between the respective battery cells such that heat accumulating between the stacked battery cells is effectively removed.

The inlet duct and the outlet duct are flow spaces through which a coolant, for effectively removing heat generated from the battery cells during the charge and discharge of the battery cells, is introduced and discharged, respectively. The inlet duct and the outlet duct are formed at the upper part and the lower part of the battery pack case, respectively.

According to circumstances, the inlet duct may have a vertical height equivalent to 40 to 95% of the vertical height of the outlet duct. In this case, it is possible to more uniformalize the flux of the coolant flowing through the flow channels defined between the battery cells. That is, when the inlet duct and the outlet duct have the same width, the flow speed of the coolant in the inlet duct is relatively increased with the decrease in height of the inlet duct, thereby preventing the concentration of the coolant between the battery cells near the coolant inlet port.

The shape of the guide members is not particularly restricted so long as the guide members can improve the distribution uniformity of the coolant flux. Preferably, the guide members are constructed in a plate-shaped structure. Also, the guide members may be constructed in a continuous structure or in a non-continuous structure. Furthermore, the guide members may be constructed in a structure in which the inlet duct is fully or partially separated into upper and lower inlet duct parts with respect to the vertical section of the inlet duct in the introduction direction of the coolant.

As previously described, the present invention provides one or more guide members. Experiments carried out by the inventors of the present invention revealed that, when a single guide member is disposed in the inlet duct such that the guide member has a length equivalent to 15 to 50% of the length of the inlet duct from the end of the coolant inlet port in the stacking direction of the battery cells, for example, the distribution of the coolant flowing through the flow channels defined between the battery cells is fairly uniformalized.

Also, when the number of the guide members is n, the respective guide members may be located upward or downward from a height t corresponding to T/n within −15% to 15% of the height T of the inlet duct. For example, when only a single guide member is disposed in the inlet duct, the guide member may be disposed upward or downward from a position T/2 corresponding to ½ of the height of the inlet duct, within upward 15% of the height T of the inlet duct and downward 15% of the height T of the inlet duct, in parallel with the stacking direction of the battery cells.

Also, when the number of the guide members is 2 or more, e.g., n, the first guide member is preferably located at the uppermost position in the inlet duct such that the first guide member extends inward from the entrance of the inlet duct in the stacking direction of the battery cells, and the $n^{th}$ guide member, having a length less than that of the $n-1^{th}$ guide member, is preferably located below the $n-1^{th}$ guide member.

For example, when the number of the guide members is 3, the second guide member, having a length less than that of the first guide member, is located below the first guide member, and the third guide member, having a length less than that of the second guide member, is located below the second guide member.

The more the number of the guide member is, more uniformly the coolant flux flowing through the flow channels defined between the respective battery cells is distributed. However, it is preferred to decide the number of the guide members in consideration of spatial limit, manufacturing efficiency, or the like.

When the number of the guide members is 2, the length and disposition of the guide members are not particularly restricted so long as the second guide member has a length less than that of the first guide member, and the second guide member is located below the first guide member. Preferably, however, the first guide member has a length equivalent to 15 to 50% of the length of the inlet duct, and the second guide member has a length equivalent to 35 to 65% of the length of the first guide member. In this case, it is possible to more uniformly cool the respective battery cells, which was confirmed through experiments carried out by the inventors of the present invention.

Also, when the number of the guide members is 2, it is preferred that the first guide member, having a length greater than that of the second guide member, be located upward or downward from a position equivalent to ⅔ of the vertical height T of the inlet duct within −10% to 10% of the height T of the inlet duct, and the second guide member be located upward or downward from a position equivalent to ⅓ of the vertical height T of the inlet duct within −10% to 10% of the height T of the inlet duct.

The battery pack case according to the present invention is preferably applied to a structure in which the cooling efficiency is critical. Specifically, the battery pack case is preferably constructed in a structure in which the length of the battery pack case in the stacking direction of the battery cells is greater than the length of the battery pack case in the lateral direction of the battery cells, and the ducts are arranged in parallel to the stacking direction of the battery cells.

The ducts include the inlet duct and the outlet duct. For example, the inlet duct may be formed at the upper part of the battery pack case such that the inlet duct is parallel to the stacking direction of the battery cells, and the outlet duct may be formed at the lower part of the battery pack case such that the inlet duct is parallel to the stacking direction of the battery cells. In this case, the coolant is introduced through the coolant inlet port, flows along the inlet duct, is uniformly distributed to the flow channels defined between the respective battery cells, flows along the outlet duct, and is discharged outside through the coolant outlet port. Of course, the inlet duct may be formed at the lower part of the battery pack case such that the inlet duct is parallel to the stacking direction of the battery cells, and the outlet duct may be formed at the upper part of the battery pack case such that the inlet duct is parallel to the stacking direction of the battery cells.

Preferably, the battery pack case is constructed in a structure in which a suction fan is mounted in the coolant outlet port for rapidly and smoothly moving the coolant, introduced through the coolant inlet port, to the coolant outlet port, such that the coolant is discharged out of the battery pack, after the coolant flows through the battery module. In this structure, the coolant, introduced through the narrow coolant inlet port, sufficiently reaches the battery cells remote from the coolant inlet port, at a high flow speed of the coolant, by a coolant driving force generated from the suction fan, and therefore, the relatively uniform distribution of the coolant flux is achieved in the condition of the same coolant flux.

In accordance with another aspect of the present invention, there is provided a middle- or large-sized battery pack constructed in a structure in which a battery module is mounted in the middle- or large-sized battery pack case with the above-stated construction.

The term "battery module" used in the specification inclusively means the structure of a battery system constructed in a structure in which two or more chargeable and dischargeable battery cells are mechanically and, at the same time, electrically connected with each other to provide high-power, large-capacity electricity. Therefore, the battery module itself may constitute a single apparatus or a part of the large-sized apparatus. For example, a plurality of small-sized battery modules are connected with each other to constitute a large-sized battery module.

Consequently, the battery module may include a plurality of plate-shaped battery cells that can be charged and discharged. In the specification, the term 'plate shape' means a shape having a relatively large length to width ratio, for example, a rectangular parallelepiped shape.

The battery cells may be secondary batteries, such as nickel metal hydride secondary batteries or lithium secondary batteries. Among them, the lithium secondary batteries are preferably used because the lithium secondary batteries have high energy density and high discharge voltage. Based on its shape, a prismatic battery or a pouch-shaped battery is preferably used as a chargeable and dischargeable unit cell constituting the battery module. More preferably, the pouch-shaped battery is used as the unit cell of the battery module because the pouch-shaped battery is manufactured with low manufacturing costs and light in weight.

The middle- or large-sized battery pack according to the present invention is preferably used as a power source for electric vehicles or hybrid electric vehicles, the safety of which may seriously deteriorate due to high-temperature heat generated from a plurality of battery cells combined to provide high power and large capacity, during the charge and discharge of the battery cells.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
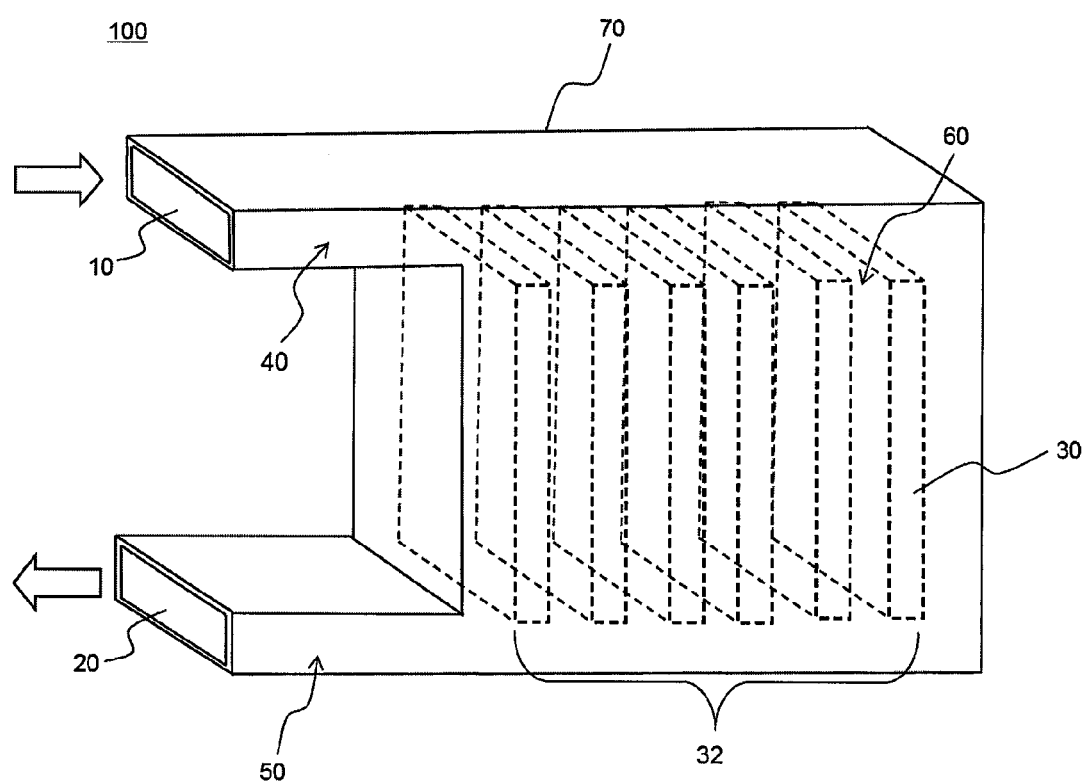
FIG. 1 is a perspective view illustrating a middle- or large-sized battery pack constructed in a structure in which a battery module is mounted in a conventional middle- or large-sized battery pack case.
Figure 2:
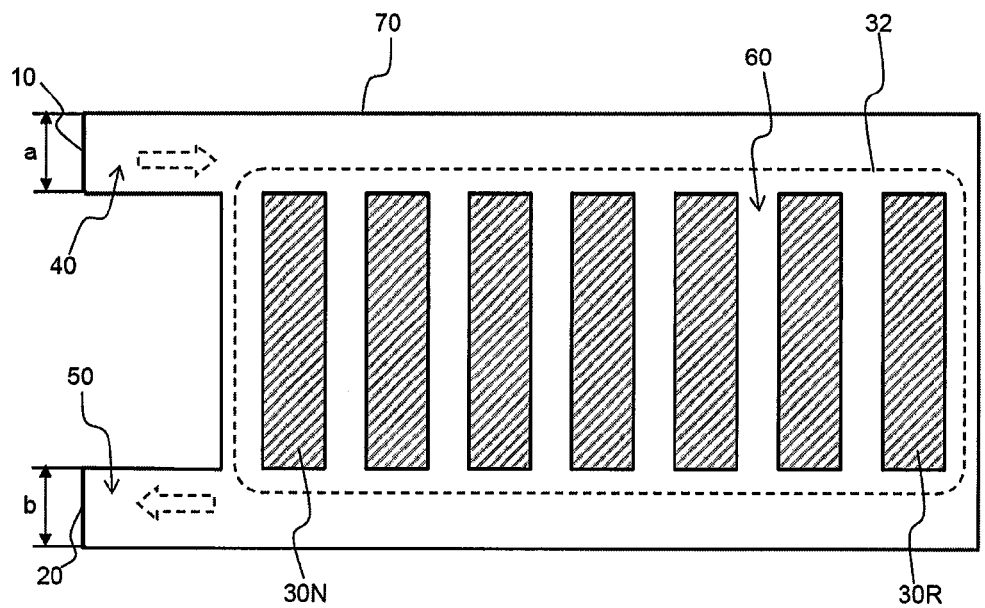
FIG. 2 is a sectional view typically illustrating the middle- or large-sized battery pack including the battery module mounted in the middle- or large-sized battery pack case shown in FIG. 1.

FIG. 1 is a perspective view illustrating a middle- or large-sized battery pack constructed in a structure in which a battery module is mounted in a conventional middle- or large-sized battery pack case, and FIG. 2 is a sectional view typically illustrating the middle- or large-sized battery pack including the battery module mounted in the middle- or large-sized battery pack case shown in FIG. 1.

Referring to these drawings, the middle- or large-sized battery pack 100 includes a battery module 32 constructed in a structure in which a plurality of plate-shaped battery cells 30 are electrically and mechanically connected with each other, a battery pack case 70 in which the battery module 32 is mounted, an inlet duct 40, as a flow space, extending from a coolant inlet port 10 to the battery module 32, and an outlet duct 50, as another flow space, extending from the battery module 32 to a coolant outlet port 20.

A coolant, introduced through the coolant inlet port 10, flows through the inlet duct 40 and flow channels 60 defined between the respective battery cells 30. At this time, the coolant cools the battery cells 30. After that, the coolant flows through the outlet duct 50 and is then discharged out of the battery pack case through the coolant outlet port 20.

The inlet duct 40 has a vertical height a equal to the vertical height b of the outlet duct 50. Consequently, the coolant flux is more distributed to the battery cell 30N near to the coolant inlet port 10, whereas the coolant flux is less distributed to the battery cell 30R remote from the coolant inlet port 10.

Figure 3:
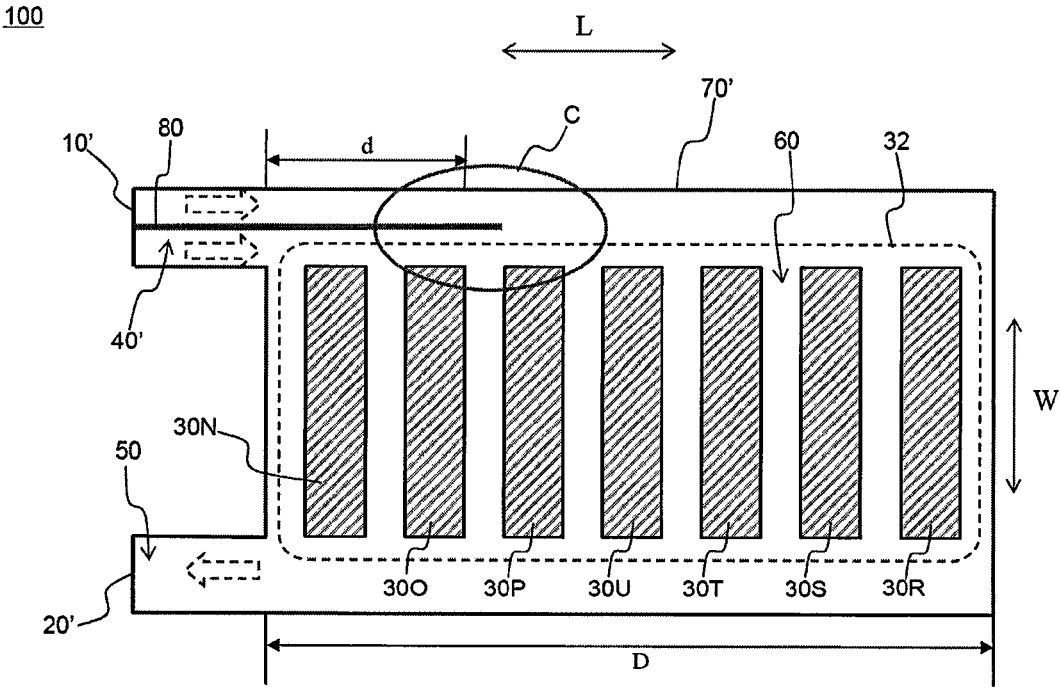
FIG. 3 is a sectional view typically illustrating a middle- or large-sized battery pack constructed in a structure in which a battery module is mounted in a battery pack case according to a preferred embodiment of the present invention.
Figure 4:
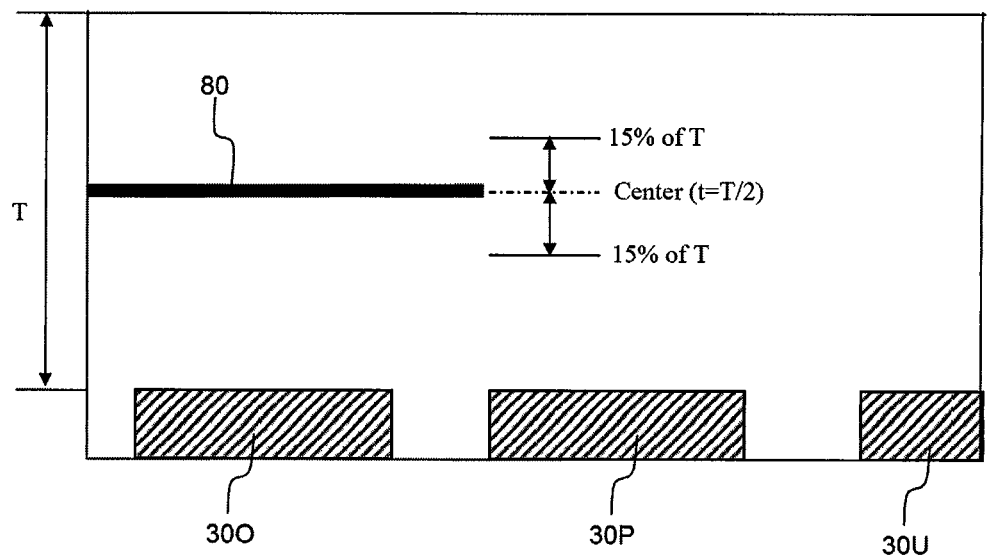
FIG. 4 is a partially enlarged view of region C typically illustrating the installation position of a guide member shown in FIG. 3.

FIG. 3 is a sectional view typically illustrating a middle- or large-sized battery pack constructed in a structure in which a battery module is mounted in a battery pack case according to a preferred embodiment of the present invention, and FIG. 4 is a partially enlarged view of region C typically illustrating the installation position of a guide member shown in FIG. 3.

Referring to these drawings, the battery pack case 70' is constructed in a structure in which the length of the battery pack case 70' in the stacking direction L of the battery cells 30 is greater than the length of the battery pack case 70' in the lateral direction W of the battery cells 30. Also, the battery pack case 70' has a coolant inlet port 10' and a coolant outlet port 20', which are disposed such that a coolant can flow from one side to the other side of the battery module 32 in the direction perpendicular to the stacking direction L of the battery cells 30.

Small flow channels 60 are defined between the respective battery cells 30 of the battery module 32 such that the coolant can flow through the flow channels 60. Consequently, the coolant, introduced through the coolant inlet port 10', flows through the flow channels 60. At this time, heat generated from the battery cells 30 is removed by the coolant. After that, the coolant is discharged outside through the coolant outlet port 20'.

The battery pack case 70' according to this embodiment is different from the battery pack case 70 illustrated in FIGS. 1 and 2 in that a guide member 80 extends inward from the coolant inlet port 10', the guide member 80 has a length d equivalent to approximately 40% of the length D of the inlet duct 40', and the guide member 80 is disposed at a position corresponding to approximately half of the height T of the inlet duct 40', i.e., approximately T/2, in parallel with the stacking direction L of the battery cells 30. As a result, the coolant flowing below the guide member 80 mainly cools the battery cells 30N, 30O, and 30P, and the coolant flowing above the guide member 80 mainly cools the battery cells 30R, 30S, 30T, and 30U. Consequently, the coolant is uniformly supplied to the respective battery cells 30N, 30O, 30P, 30R, 30S, 30T, and 30U.

In this case, the guide member 80 may be located upward or downward from T/2, preferably within 15% of the T.

Figure 5:
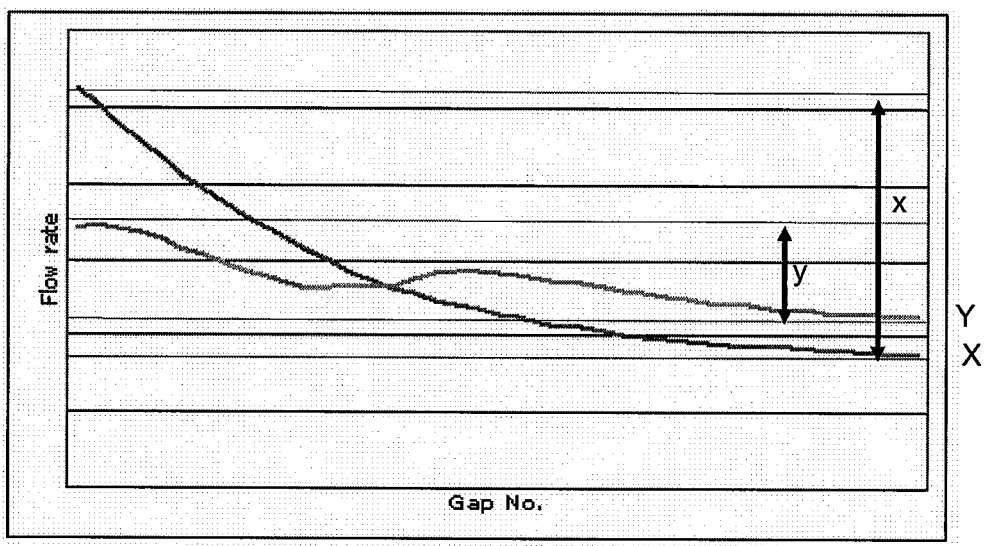
FIG. 5 is a graph illustrating the comparison between the measurement results of coolant flux distribution between battery cells of the middle- or large-sized battery packs manufactured in the structures shown in FIGS. 2 and 3.

In this regard, FIG. 5 is a graph illustrating the comparison between the measurement results of coolant flux distribution between battery cells of the middle- or large-sized battery packs manufactured in the structures shown in FIGS. 2 and 3. Specifically, both the measurement results X of coolant flux distribution in the middle- or large-sized battery pack 100 of FIG. 2 and the measurement results Y of coolant flux distribution in the middle- or large-sized battery pack 200 of FIG. 3, constructed in a structure in which the guide member is disposed in the inlet duct in parallel to the stacking direction of the battery cells, are illustrated in FIG. 5.

When comparing the coolant flux difference y of the Y with the coolant flux difference x of the X, it can be seen that the coolant flux difference y of the Y is less than the coolant flux difference x of the X, during the flow of the coolant at the battery cells 30N (see FIG. 2) adjacent to the coolant inlet port, and therefore, the distribution uniformity of coolant flux is greatly improved.

This is because the coolant is divided into two coolant components by the guide member 80 in the inlet duct 40', and therefore, the coolant component flowing below the guide member 80 is mainly distributed to the battery cells positioned near to the coolant inlet port 10', and the coolant component flowing above the guide member 80 is uniformly distributed to the battery cells positioned remote from the coolant inlet port 10'.

Figure 6:
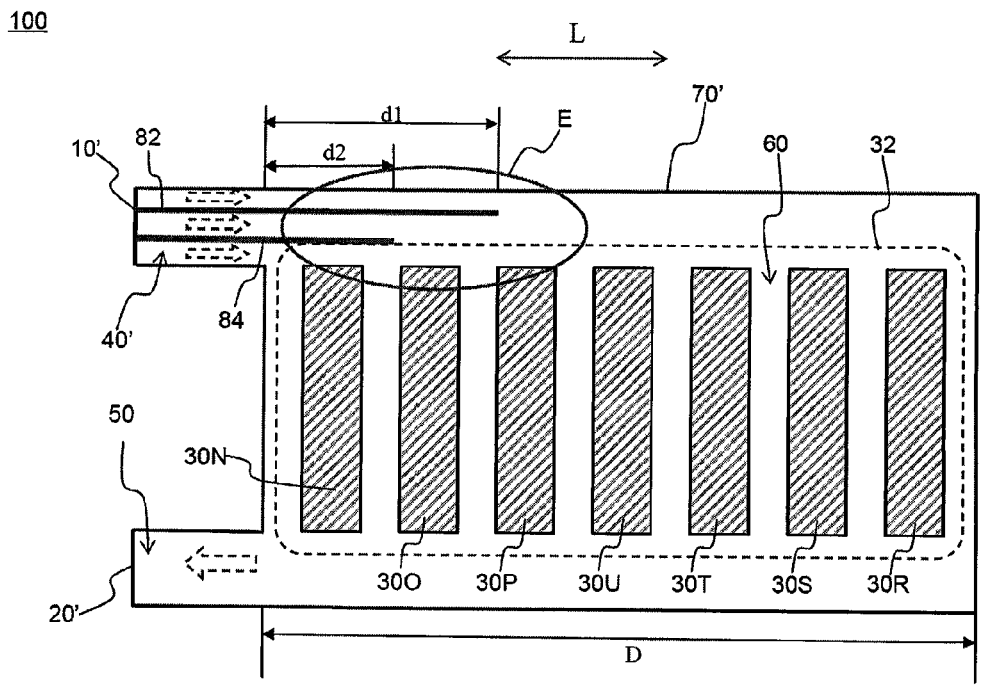
FIG. 6 is a sectional view typically illustrating a middle- or large-sized battery pack constructed in a structure in which two guide members are disposed in a battery pack case according to another preferred embodiment of the present invention.
Figure 7:
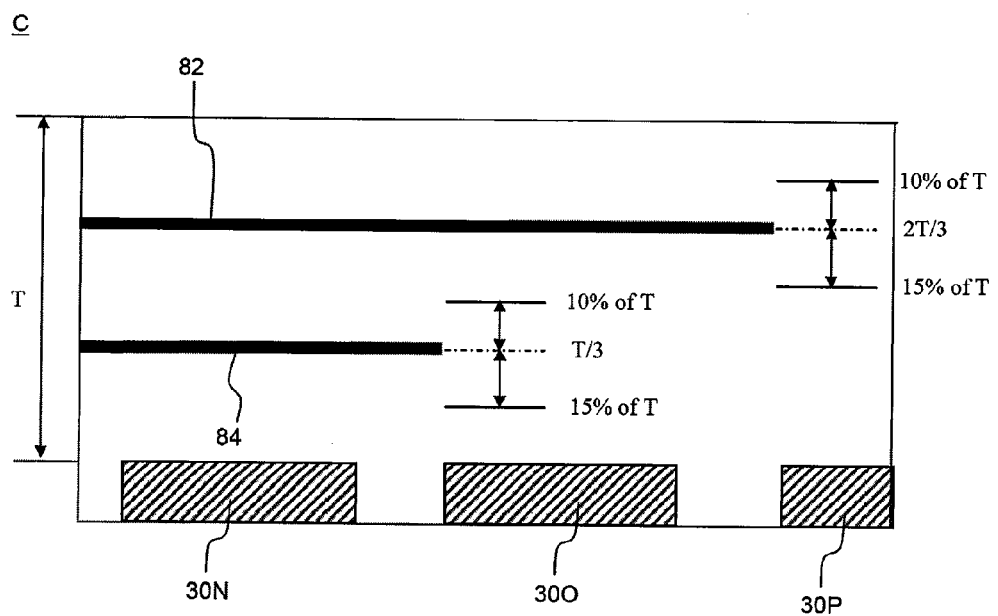
FIG. 7 is a partially enlarged view of region E typically illustrating the installation positions of the two guide members shown in FIG. 6.

FIG. 6 is a sectional view typically illustrating a middle- or large-sized battery pack constructed in a structure in which two guide members are disposed in a battery pack case according to another preferred embodiment of the present invention, and FIG. 7 is partially enlarged view of region E typically illustrating the installation positions of the two guide members shown in FIG. 6.

Referring to these drawings, a first guide 82, having a length d equivalent to approximately 40% of the length D of the inlet duct 40, extends inward from the coolant inlet port 10 at a position corresponding to 2/3 of the height T of the inlet duct 40, i.e., 2T/3, in parallel to the stacking direction L of the battery cells. Also, a second guide 84, having a length d2 equivalent to approximately 50% of the length d1 of the first guide 82, extends inward from the coolant inlet port 10 at a position corresponding to 1/3 of the height T of the inlet duct 40, i.e., T/3, in parallel to the stacking direction L of the battery cells. As a result, the coolant flowing below the second guide member 84 mainly cools the battery cells 30N and 30O, the coolant flowing between the first guide 82 and the second guide 84 mainly cools the battery cells 30O and 30P, and the coolant flowing above the first guide member 82 mainly cools the battery cells 30P, 30U, 30T, 30S, and 30R.

In this case, the first guide member 82 and the second guide member 84 may be located upward or downward from 2T/3 and T/3, preferably within −10% to 10% of the T, respectively.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the middle- or large-sized battery pack case according to the present invention is constructed in a structure in which one or more guide members to guide the flow of the coolant are disposed in the inlet duct in parallel to the stacking direction of the battery cells. Consequently, the present invention has the effect of improving the distribution uniformity of coolant flux, effectively removing heat accumulating between the battery cells, and therefore, greatly improving the performance and life span of the battery cells.

What is claimed is:

1. A middle- or large-sized battery pack case in which a battery module having a plurality of stacked battery cells, which can be charged and discharged, is mounted, wherein
the battery pack case is provided with a coolant inlet port and a coolant outlet port, which are disposed such that a coolant for cooling the battery cells can flow from one side to the other side of the battery module in the direction perpendicular to the stacking direction of the battery cells, the battery pack case is further provided with a flow space ('inlet duct') extending from the coolant inlet port to the battery module and another flow space ('outlet duct') extending from the battery module to the coolant outlet port, first and second guide members are disposed in the inlet duct for guiding the flow of the coolant in the direction parallel to the stacking direction of the battery cells, the first guide member is located at the uppermost position in the inlet duct such that the first guide member extends inward from the entrance of the inlet duct in the stacking direction of the battery cells, and the second guide member, having a length less than that of the first guide member, is located below the first guide member, and the first guide member is located upward or downward from a position equivalent to ⅔ of the vertical height (T) of the inlet duct within −10% to 10% of the height (T) of the inlet duct, and the second guide member is located upward or downward from a position equivalent to ⅓ of the vertical height (T) of the inlet duct within −10% to 10% of the height (T) of the inlet duct.

2. The middle- or large-sized battery pack case according to claim 1, wherein the inlet duct has a vertical height equivalent to 40 to 95% of the vertical height of the outlet duct.

3. The middle- or large-sized battery pack case according to claim 1, wherein the battery pack case is constructed in a structure in which the length of the battery pack case in the stacking direction of the battery cells is greater than the length of the battery pack case in the lateral direction of the battery cells, and the ducts are arranged in parallel to the stacking direction of the battery cells.

4. The middle- or large-sized battery pack case according to claim 1, wherein the battery pack case is constructed in a structure in which a suction fan is mounted in the coolant outlet port for forcibly moving the coolant, introduced through the coolant inlet port, to the coolant outlet port, after the coolant flows through the battery module.

5. A middle- or large-sized battery pack constructed in a structure in which a battery module is mounted in a middle- or large-sized battery pack case according to claim 1.

6. The middle- or large-sized battery pack according to claim 5, wherein the battery module includes a plurality of plate-shaped battery cells that can be charged and discharged.

7. The middle- or large-sized battery pack according to claim 6, wherein the battery cells are lithium secondary batteries.

8. The middle- or large-sized battery pack according to claim 7, wherein the battery pack is used as a power source for electric vehicles or hybrid electric vehicles.

9. A middle- or large-sized battery pack constructed in a structure in which a battery module is mounted in a middle- or large-sized battery pack case according to claim 2.

10. A middle- or large-sized battery pack constructed in a structure in which a battery module is mounted in a middle- or large-sized battery pack case according to claim 3.

11. A middle- or large-sized battery pack constructed in a structure in which a battery module is mounted in a middle- or large-sized battery pack case according to claim 4.

12. The middle- or large-sized battery pack case according to claim 1, wherein the first and second guide members have a length equivalent to 15 to 50% of the length of the inlet duct.

13. The middle- or large-sized battery pack case according to claim 1, wherein the first guide member has a length equivalent to 15 to 50% of the length of the inlet duct, and the second guide member has a length equivalent to 35 to 65% of the length of the first guide member.

14. A middle- or large-sized battery pack constructed in a structure in which a battery module is mounted in a middle- or large-sized battery pack case according to claim 12.

15. A middle- or large-sized battery pack constructed in a structure in which a battery module is mounted in a middle- or large-sized battery pack case according to claim 13.

* * * * *